April 17, 1934.  L. P. LEE  1,955,137

STEEL SAW-TOOTH

Original Filed June 27, 1932

INVENTOR

BY

ATTORNEY

Patented Apr. 17, 1934

1,955,137

UNITED STATES PATENT OFFICE 1,955,137

STEEL SAW-TOOTH

Lars Paulsen Lee, Seattle, Wash.

Application June 27, 1932, Serial No. 619,425
Renewed March 10, 1934

1 Claim. (Cl. 143—143)

My invention relates to an improvement in teeth for ordinary saws and planer saws as are now generally used by woodworking factories, saw mills and shingle mills, such saws being either circular, band, gang or drag saws.

The objects of the invention are in short as follows:

To provide a saw tooth which may be shaped on circular saws in diameter from three inches and upward and on straight saws one half inch and upward in width, enabling such saws to cut and plane in one process at same rate of speed and at same rate of feed as required by ordinary rough cutting saws, the tooth to maintain its usefulness and efficiency, when properly resharpened, until the body of the saw is worn out in matter of diameter or width.

Furthermore, to provide a saw tooth, although being able to cut and plane in one process, which may be manufactured so cheaply that the cost of saws, equipped with the herein described tooth, will not exceed the cost of ordinary saws of same thickness, width and length; neither will the cost of reconditioning or upkeep, such as grinding or filing the dull saws, exceed the cost of upkeep of ordinary saws.

Mainly, the object of the invention is to provide a saw tooth, which will enable the largest circular and straight saws in one process to cut and plane immense timber, be it in form of log, plank or small lumber, the shape and offset of the tooth being such that it utilizes the wood, which is ordinarily wasted as shavings in a planing mill, for producing a large enough kerf in log or lumber to keep the saw from heating and binding, thereby wasting no additional wood for planing.

It is also the object of the invention to provide a saw, equipped with teeth as herein described, which will run safely and steadily lengthwise also through the center of the log, which is generally marred by splits and shakes, necessitating the elimination of all beveled points, hooks and cutting or planing edges, which have proved a great danger and detriment in using many other types of saws for lengthwise ripping, the beveled teeth being caught in a split and forced sideways or out of correct course; consequently all parts of the herein described saw tooth being filed and ground at right angles with the plane of the saw.

Finally, it is the object of this invention to provide a saw tooth which will enable such saws as are equipped with the herein described teeth to cut and plane in one process without requiring more driving power than for an ordinary rough cutting saw of same thickness. This object is attained by the provision of a cutting hook with chisel tooth, assisted by a special and peculiar offset, giving more outward twist or offset to the lower portion of the tooth than the upper, including the point of the tooth, thereby not requiring the points of the teeth to have a combined spread to undertake the heavy work by approximately vertical cutting of the lengthwise grain to form the complete kerf for free movement of the saw; the lighter work of cutting slantingly is left to the lower portion of the straight edge when performing the planing, resulting in an adequate and planed kerf without the expenditure of as much driving power as if and when the points of the teeth alone had executed a large enough clearance by approximately vertical cutting of the grain of the wood, also resulting in no waste of wood for the planing process.

This invention resides in a specially constructed saw tooth, both its front lines and spread or offset being different from those used in ordinary rough cutting and in various planer saws. Front lines and special offset are essential for constituting the complete shape of the tooth as viewed from the side and from the top.

The Figures 1, 2 and 3 in the attached design illustrate the means by which I attain the objects of my invention.

Figure 1:
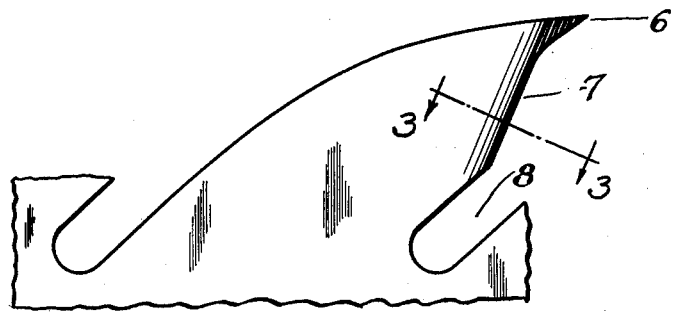
Fig. 1 is a side view of the saw tooth as shaped on saws, either circular or straight.
Figure 2:
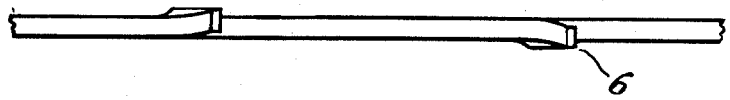
Fig. 2 is a top view of the tooth.
Figure 3:
Fig. 3 illustrates a cross section of the tooth on line 3—3 of Fig. 1.
Figure 4:
Fig. 4 illustrates the tooth applied to a circular saw.

No. 6 in Fig. 1 is the cutting hook with chisel point.

No. 7 in Fig. 1 illustrates the straight, sharp edge, which performs the planing, although its front face is at right angle with the plane of the saw.

No. 8 in Fig. 1 illustrates a notch, mainly constructed to free the lowest point of the straight edge, No. 7, from the body of the saw in order to allow its sidewise offset without curving either the straight edge of the saw; the notch also to serve as storage room for sawdust until released at the under side of the log or lumber.

Describing more fully the above mentioned details, the cutting hook (Fig. 1 No. 6) has a chisel point, same point and the upper and lower side of the hook being made at right angles with the plane of the saw, and being offset into the same plane with the straight edge (Fig. 1 No. 7). The point of the hook is made as sharp as possible to cut the hard grain of the wood, its convex upper face having a slant from the cutting line of approximately ten degrees, thereby allowing sufficiently heavy inroad into the wood for each tooth to insure a fast rate of sawing. The length of the hook is approximately 3/16 of an inch, more or less, depending upon the size of the tooth.

The straight edge (Fig. 1 No. 7), which performs the planing, descends in a perfectly straight line, both as regards side view and top view, from the base of the cutting hook (Fig. 1 No. 6) to a notch (Fig. 1 No. 8), forming a backward angle of approximately twenty degrees with the radius in a circular and the vertical cross line in a straight saw. The straight edge, although not beveled, but its front face at right angles with the body of the saw after being subjected to an offset as described below, is carefully sharpened to remove efficiently and smoothly all and any unevenness of the wood left by the point of the cutting hook, thereby performing a satisfactory planing.

The entire front portion of the tooth from point of hook to notch at the base of the tooth is offset alternately to left and to right to produce adequate kerf in the wood to give free movement to the saw and also to allow the straight edge for its full length to be forcefully pressed against the side of the kerf as produced by the cutting hook, one tooth planing right side, the other left. The offset consists in bending or rolling or folding the front of the tooth slightly outwards in such a manner that the cutting hook and its chisel point and every point in the straight edge are situated in a straight plane, which forms an angle of approximately three degrees with the body of the saw, using the outward point of the chisel as vertex of the angle; in other words the lower portion of the straight edge (Fig. 1 No. 7) is slightly more offset than the upper and the hook and its point.

The length of the straight edge (Fig. 1 No. 7) may vary from approximately one half to two inches, depending upon the size of the saw and the size of the saw teeth.

The notch, (Fig. 1 No. 8), while in no way partaking in cutting and planing, is a very essential detail of the tooth, being purposely made with a curve at bottom and with straight parallel sides to be conveniently shaped and deepened by the use of a thin grinding wheel on an ordinary automatic or hand grinding machine. The ultimate function of the notch is to enable the maintenance of strength and shape of the tooth, despite numerous resharpenings, thereby maintaining the usefulness of the saw, equipped with teeth as herein described, until worn out or reduced from a large diameter or width to such a small size as to be unfit for its purpose. The notch allows the tooth to be freely folded or offset to desired sidewise distance without twisting any other part of the tooth or the body of the saw, and when a fresh offset is needed after each resharpening of the tooth, the additional offset is made in fresh steel, which has not previously been bent or twisted, thereby insuring and maintaining the original strength of the tooth and the saw. The width and depth of the notch will depend upon the size of the tooth.

I claim:

A saw, each tooth having a wedge-shaped cutting hook ending in a chisel point, both point and upper and lower faces of the hook being at right angles with the plane of the saw and the upper face having a backward slant from the cutting line of about ten degrees; a sharp edge, also at a right angle with the plane of the saw, descending in a straight line from the base of the hook to a notch at the base of the tooth, said straight edge forming a backward angle of approximately twenty degrees with the radius of a circular, or the vertical cross line of a straight, saw; the front portion of successive teeth from point of hook downward to the notch being offset, alternately to left and to right, in such a manner that all points and lines of the front face of the entire tooth are located in a straight plane forming an angle of about three degrees with the plane of the saw, using the outside point of the hook as vertex of the angle.

LARS PAULSEN LEE.